US006915425B2

(12) United States Patent
Xu et al.

(10) Patent No.: US 6,915,425 B2
(45) Date of Patent: Jul. 5, 2005

(54) SYSTEM FOR PERMITTING OFF-LINE PLAYBACK OF DIGITAL CONTENT, AND FOR MANAGING CONTENT RIGHTS

(75) Inventors: Bin Xu, Sunnyvale, CA (US); Weijun Li, Sunnyvale, CA (US); Kyle Smith, San Jose, CA (US); Dalun Bao, Mountain View, CA (US)

(73) Assignee: Aladdin Knowledge Systems, Ltd., Tel Aviv (IL)

( * ) Notice: Subject to any disclaimer, the term of this patent is extended or adjusted under 35 U.S.C. 154(b) by 825 days.

(21) Appl. No.: 09/739,076

(22) Filed: Dec. 13, 2000

(65) Prior Publication Data

US 2002/0108049 A1 Aug. 8, 2002

(51) Int. Cl.$^7$ ............................... H04L 9/32; H04N 7/16
(52) U.S. Cl. ........................................ 713/165; 380/201
(58) Field of Search ................................ 713/193, 200, 713/201, 165; 380/201; 705/57, 58, 59

(56) References Cited

U.S. PATENT DOCUMENTS 5,673,316 A * 9/1997 Auerbach et al. ............. 705/51

* cited by examiner

Primary Examiner—Matthew Smithers
(74) Attorney, Agent, or Firm—Hoffman, Wasson & Gitler, PC (57) ABSTRACT

A system for permitting offline content playback and for managing the rights to one or more digital content files within a computer network. The system manages these rights by encrypting the content files to prevent unauthorized access to the files. Encryption is accomplished by using one or more keys which are associated with one or more segments of the content file. These keys enable an authorized user to decrypt and playback the content files at a subsequent time. When the keys are received, a license which specifies the rights of the user regarding the content files, is obtained by the end user system, and verified locally to permit the content playback.

15 Claims, 6 Drawing Sheets

SYSTEM FOR PERMITTING OFF-LINE PLAYBACK OF DIGITAL CONTENT, AND FOR MANAGING CONTENT RIGHTS

CROSS-REFERENCE TO RELATED APPLICATION

This application is related to co-pending U.S. patent application Ser. No. 09/659,902, filed Sep. 12, 2000, entitled "System for Managing Rights and Permitting On-Line Playback of Digital Content" which is hereby incorporated by reference as if set forth in full in this application.

BACKGROUND OF THE INVENTION

This invention relates to the field of information processing and more particularly to systems for implementing off-line digital management rights.

Increased use of electronic computer networks, such as the Internet has resulted in a fundamental problem now facing content providers, namely, the problem of how to prevent the unauthorized use and distribution of digital content. These content providers include publishers of video games, music, books, medical information, information database providers, and providers of interactive web players. Examples of interactive web players currently available on the market are Quicktime 4™ available from Apple Computer, Inc.®, RealPlayer™ available from RealNetworks, Inc.® and Shockwave 7™ available from MacroMedia, Inc.®.

These content providers are concerned with getting compensated for their work. Unauthorized copying and use of content providers works deprives rightful owners of billions of dollars according to a well-known source. Unauthorized copying is exercebated because consumers can easily retrieve content, and technology is available for perfectly reproducing content.

A number of mechanisms have been developed to protect against unauthorized access and duplication and to provide digital rights management. One method is a digital rights management system that allows a set of rules to determine how the content is used. Another method (for software) for curbing unauthorized duplication is the use of a scheme which provides software tryouts or demos that typically work and expire after a specific duration. Other methods use a copy protection scheme that limits the number of copies that a user can make, after which additional copying results in corrupt copies. Further, an alternate scheme requires the presence of a license on a client workstation for the software to operate.

Many of the aforementioned schemes are typically implemented using "encryption/decryption" of the digital content. Encryption is the conversion of data into an unintelligible form, e.g., ciphertext, that cannot be easily understood by unauthorized users. Decryption is the process of converting encrypted content back into its original form such that the it becomes intelligible. Simple ciphers include the rotation of letters in the alphabet, the substitution of letters for numbers, and the "scrambling" of voice signals by inverting the sideband frequencies. More complex ciphers work according to sophisticated computer algorithms that rearrange the data bits in digital information content.

In order to easily recover the encrypted information content, the correct decryption key is required. The key is an algorithm that decodes the work of the encryption algorithm. The more complex the encryption algorithm, the more difficult it becomes to decode the communications without access to the key. Generally, there are two types of key schemes for encryption/decryption systems, namely (1) Public Key Systems (PKS) or asymmetric systems which utilize two different keys, one for encryption, or signing, and one for decryption, or verifying; and (2) nonpublic key systems that are known as symmetric, or secret key, systems.

Although the use of public or private key can be an effective way to prevent access to digital content, the transfer of keys often requires extensive coordination with the end user. Also, the use of keys in the related art does not always provide flexible licensing arrangements, or an efficient way to handle many instances of different deliverable digital content products.

Therefore, there is a need to resolve the aforementioned problem relating to conventional approaches for protecting digital information particularly with regard to managing the digital rights for off-line distribution of interactive web content and music.

SUMMARY OF THE INVENTION

A system for permitting off-line playback of digital content files, and for managing related content rights. The system comprises a content builder for encrypting the content files to prevent unauthorized access to the files, and a license module for generating a license which authorizes the user to playback the file. Advantageously, the system permits verification of the license while the user is offline, and permits decryption of the content file to permit offline playback of the content files.

In a first embodiment, the system comprises a method for permitting offline playback of a content file on a user computing device upon offline verification of the terms of a license for authorizing the playback of the content file. The method comprises the steps of identifying the license by using one or more information fields within the header, verifying the terms of the license locally on the user computing device while the user is offline, retrieving from the license, a session key for decrypting the content file, retrieving from the license, a segment which is part of the content file, decrypting the content file using the session key to permit playback of the content file for a single session, and combining the segment with the content file to permit playback of the content file.

DETAILED DESCRIPTION OF THE DIAGRAMS

Overview

A system for enabling the off-line playback of content files by an authorized user system, and for managing the rights to digital content files within a computer network. The system includes a content builder for encrypting the content files to prevent unauthorized access to the files. The system encrypts the files by using one or more keys which are associated with one or more segments of the content file. These keys enable an authorized user to decrypt and playback the content files at a subsequent time. When the keys are received by an end user's system, it retrieves a license from a license server which specifies the rights of the user as it relates to the content files. Therefore, at the very least, one or more keys and a license are required in order for a user to play back a content file. In this manner, the present system manages digital rights pertaining to such content files in accordance with one embodiment of the present invention. As used herein, the term "content" refers to digital information. The present invention will be further understood with reference to the diagrams and descriptions which follow.

Embodiments of the Present Invention

Figure 1:
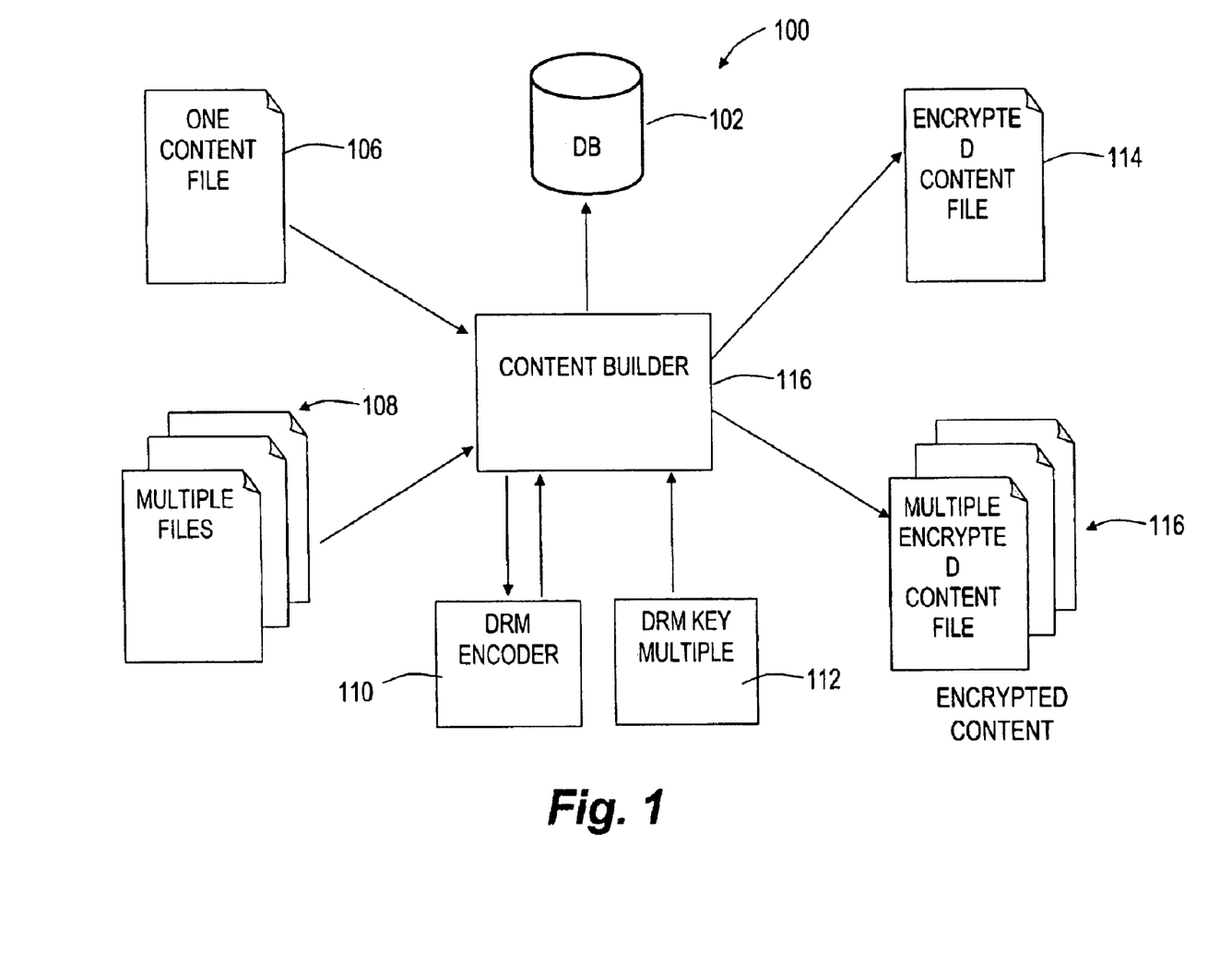
FIG. 1 is a block diagram of a system that provides a content encryption functionality according to the present invention.

FIG. 1 is a block diagram of system 100 that provides a content encryption functionality according to the present invention.

In FIG. 1, system 100 comprises DRM key module 112 for associating the information contained within a content file with a license, database 102 for storing key sheaves received from content builder 112, content builder module 116 for encrypting one or more digital files, and DRM encoder 110 for coordinating encryption as well as providing a header, without limitation. In a typical content encryption procedure, content builder 116 receives a single unencrypted content file 106 (or multiple unencrypted content files 108) for encryption. Example of content files 106 are musical recordings and audio or video images. Further, content files 106 may be may be from third party sources or directly from the content providers.

When content file 106 is received, content builder 116 utilizes an encryption algorithm to implement the encryption process. In one embodiment, this process is accomplished by segmenting content file 106 into variable segments, each segment being encrypted with a separate key. A "key" may be a variable value that is applied to content file 106 using an algorithm to produce encryption text. A single key or multiple keys having constant or variable lengths may be employed depending on which embodiment is implemented. After the encryption process, the keys are saved in database 102 for later retrieval during the playback process. In an exemplary embodiment, database 102 is an industry standard database system such as Oracle 8™ available from Oracle, Inc.® Content builder 116 also functions to interact with database 102 to create the necessary information to enable the sale, distribution and tracking of the content within system 100.

Advantageously, during the encryption process, content builder 116 removes a portion of content file 106 and in its place inserts a header (not shown), supplied by DRM encoder 110. The removed portion is thereafter added to a license file for authorizing playback of the content file 106. Therefore, the removed portion is considered part of the keys. Depending on the embodiment being implemented, the removed portion may be added to a pre-configured license, the terms of which are predefined. During the playback process, the pre-configured license is then retrieved when its terms are the same as the user's transaction. Alternatively, the removed portion may be saved and later added to a license which is generated on the fly during the playback process. In any event, once the license is obtained, the removed portion is thereafter recombined with the original content portion during the playback process.

Advantageously, removing a portion of content file 106 also provides a measure of extra security as the removed portion of content file 106 remains unavailable until decryption time. Therefore, copying encrypted content to another machine is completely useless without the back binding license. In this manner, the process of seeking a specific location in content file 106 during the decryption process is simplified. The header within content file 106 contains information fields such as the license name, the content file identification, and the license server URL (uniform resource locator).

The license name field enables content file 106 to be associated with the license file (containing the removed content portion). The content identification field identifies the content file 106 while the license server URL points to the address of the license server where the license is generated (or located). Although a multiple-field header is not shown, one of ordinary skill in the art will realize that the header may contain multiple fields for identifying various types of information other than those referenced above.

Figure 2:
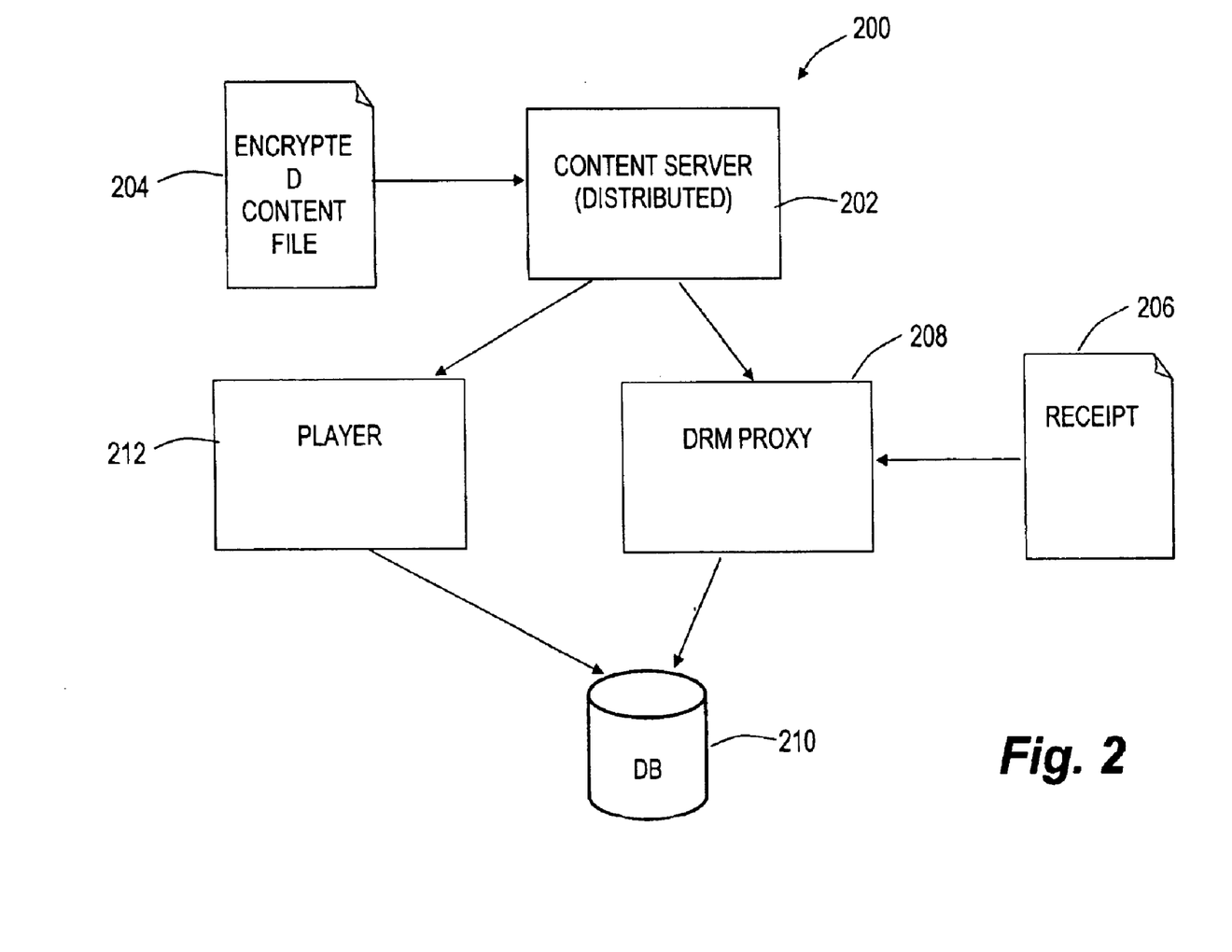
FIG. 2 is an exemplary schematic block diagram of a delivery system that functions to deliver encrypted content files for storage within an end user disk.

FIG. 2 is an exemplary schematic block diagram of delivery system 200 that functions to deliver encrypted content 204 files for storage within end user disk 210. After storage, encrypted content 204 may be retrieved when the user desires to playback the files. In FIG. 2, delivery system 200 comprises content server 202 for generating encrypted content 204, interactive web player 212 for playing the content file, and DRM proxy 208 which handles client to server communication. DRM proxy 208 functions to retrieve content 204 from content server 202, using a receipt 206. It should be noted that DRM proxy 208 is separate and apart from content player 212 because frequent modifications to the DRM proxy 208 may be carried out as proves necessary, without modifying other components.

Alternatively, a module which implements the functionality of DRM proxy 208 may be combined with content player 212, in which case, content player 211 functions as single unit that retrieves and plays the encrypted content file. Examples of content players which are currently available on the market are Quicktime 4™ available from Apple Computer, Inc.®, RealPlayer™ available from RealNetworks, Inc.® and Shockwave 7™ available from MacroMedia, Inc.®. Although not shown, one of ordinary skill in the art will realize that various permutations of modules and modes for retrieving encrypted content 204 are possible.

Figure 3:
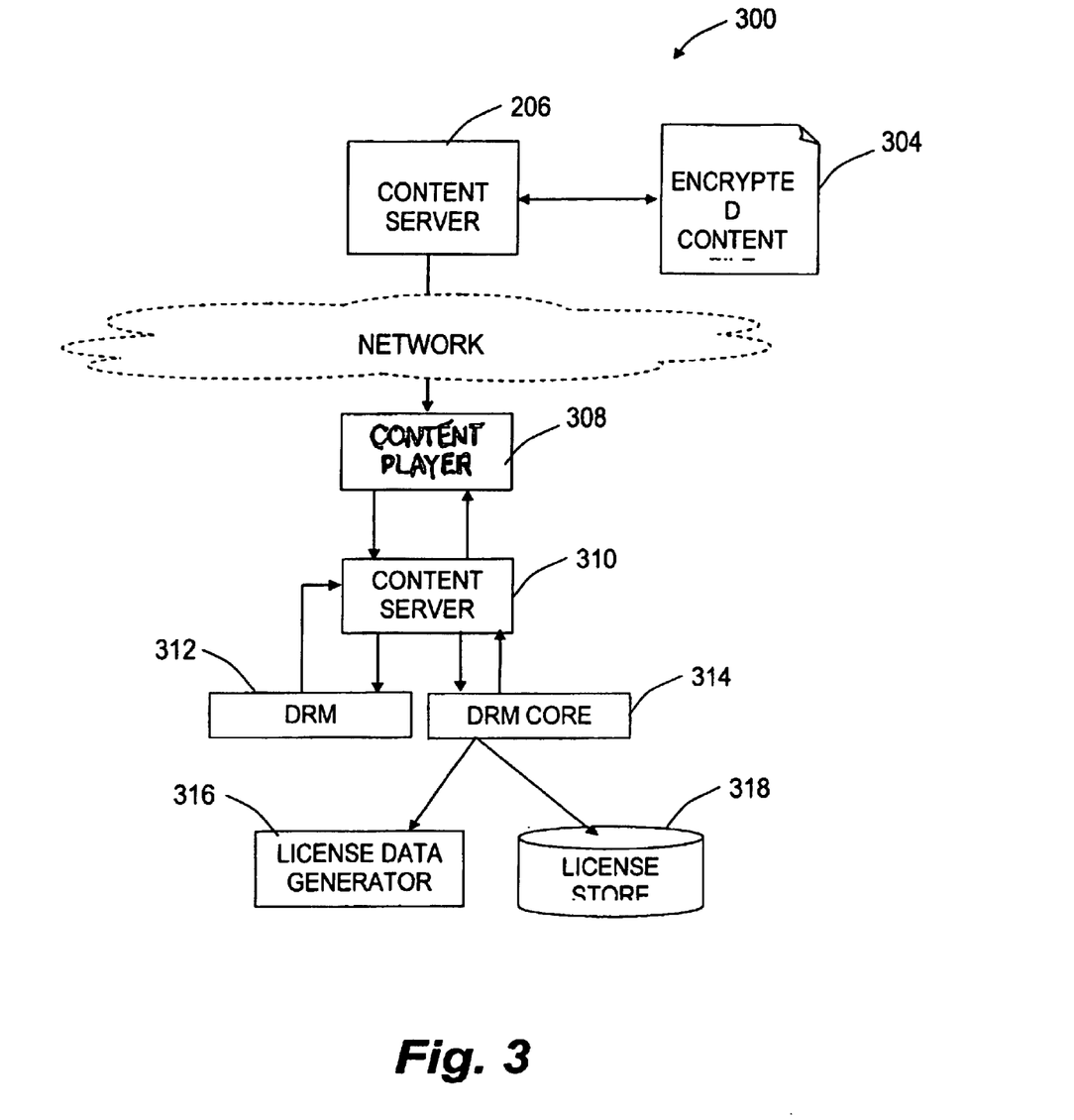
FIG. 3 is a block diagram of a system for permitting off-line license verification to enable playback of encrypted content files according to the present invention.

FIG. 3 is a block diagram of system 300 for permitting off-line license verification to enable playback of encrypted content files 304 according to the present invention. In FIG. 3, system 300 comprises a number of components, namely, content server 302 for encrypting and uploading content files 304, content player 308 for enabling playback of the content files, and player module 310 for decoding the encrypted content file.

In operation, after a user consummates a purchase transaction, content files 304 are delivered to and stored on the user's local disk. Of course, along with content files 304, a license (not shown) that grants the rights to play the content is also downloaded and stored within license store 318. At this point, the user may defer playback of the content, until a subsequent time that is convenient. It should be observed that content files 304 as well as the license remain encrypted, and are dynamically decrypted on the fly whenever the user initiates playback.

Upon initiation of the off-line playback process (via a user interface, not shown, for example), content player 308 begins by retrieving a first portion of encrypted content files 304 from the user's local disk. The first portion of the retrieved content file, contains a content header (described in FIG. 1) for identifying a license name, a content identification, or a license server URL among other information. Thereafter, the first portion is handed over to player module 310, which begins to coordinate the decryption of content files 304. Player module 310 contacts DRM core 314 to request a session key for decrypting the content files.

Because the requested key is contained within the license, DRM core 314 must identify the appropriate license. This is accomplished by reading the content header to identify the license name, and the content identification. In an alternate embodiment, when the license is not stored locally, the header may contain the URL of a license server (not shown) wherein the license is located. In addition, license data generator 316 provides DRM core 314 with a machine identification which is unique to the end user's machine for comparison with the header information.

Using all of the obtained information, DRM core 314 retrieves the license from license store 318. DRM core 314 verifies the terms of the license, and retrieves the session key which is contained within the license. Advantageously, the session key is a single session key, meaning that it enables playback of the encrypted files only for a single session. After retrieving the session keys, DRM core 314 passes the key securely back to player module 310. In turn, player module 310 forwards the key and encrypted content files 304 to DRM decoder 312 which executes the decryption process and returns the decrypted files to player module 310. Finally, content player 310 passes the decrypted content files content player 308 for playback. In this manner, the present invention permits license verification while the user is offline.

It should be noted that the preceding steps are only performed for the first portion of encrypted content after which subsequent portions are automatically played back. Further, it should be observed that there are implications for the player module 310 when it hands encrypted content to the decoder module 312, because content is encrypted on a frame-by-frame basis. This makes seeking a specific location and the content a little more difficult and, as such, the decoder module may be provided with API (application programming interface) to aid the caller in dealing with these frames. In this manner, the present invention enables system 300 to upload encrypted content files 304 and play back those content files using a content player module 310. Advantageously, system 300 allows only authorized users to playback content files in accordance with one embodiment.

Figure 4:
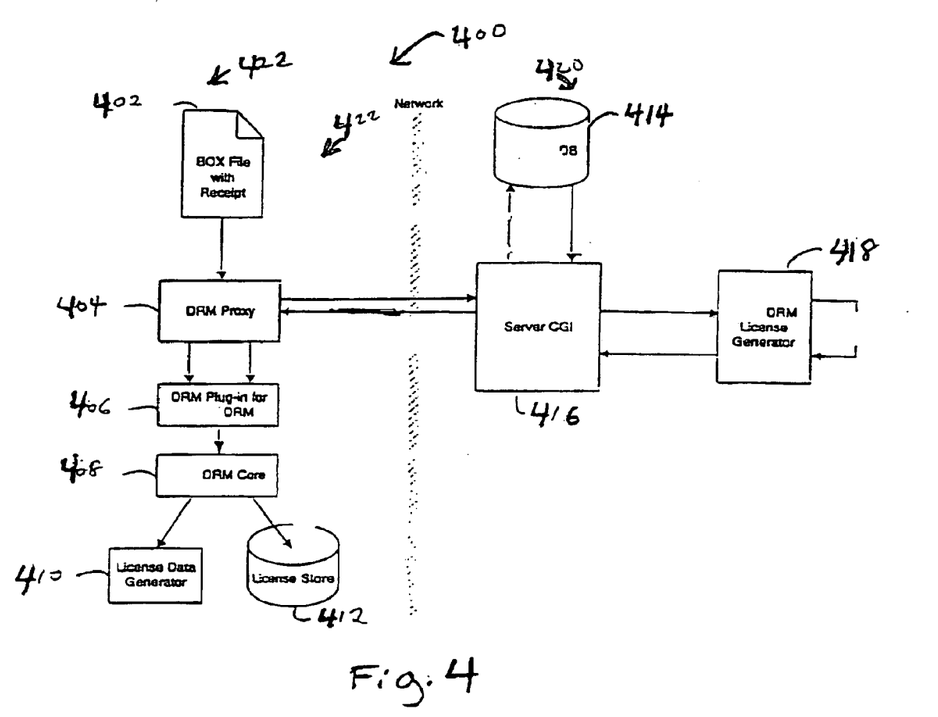
FIG. 4 is a block diagram of a system for acquiring a license which authorizes a user to playback a content file.

FIG. 4 is a block diagram of system 400 for acquiring a license which authorizes the user to playback a content file.

In FIG. 4, as shown in an exemplary embodiment, system 400 includes client and server sides 422 and 420. Among other components, client side 422 includes DRM proxy 404 for preparing data for a license request, module 406 for building a license request message, DRM core 408 for obtaining machine specific information from license data generator 410, and license database 412 for storing license files.

In a typical operation, the user purchases content such as music recordings (for example) from the store front at a website (not shown). Numerous websites are available for purchasing various types of digital content including Disney.com®, Sony.com®, and Shockwave.com®, for example. Using a web browser or a program that is capable of posting a web form to server 416, the user initiates the transaction with the appropriate website. The transaction typically involves several round trips to the web site with the transaction concluding with a request for a box file 402. Box file 402 is a file that describes the content requested by the user, and in one embodiment has a .cBox extension.

DRM proxy 404 contains a box file handler and is registered with system 400 as the handler for files with the .cBox extension. When box file 402 is received, DRM proxy 404 directs module 406 to build a license request message for forwarding to license server 416. In one embodiment, this request is in XML (extensible markup language) format. Module 406 queries the machine identification to be included in the license request. Thereafter, DRM proxy 404 starts a network job which sends the license request message to license server 416. License server 416, in one embodiment is a CGI (common gateway interface) program available through license server 416.

Upon receipt of the license request, license server 416 verifies that the content file has been purchased prior to continuing with the processing of the license request. data base 414 contains the terms of the license along with the keys for decrypting the content file. These terms are retrieved and forwarded to license generator 418. It should be observed that a different license generator is implemented for each digital rights management solution being employed on client side 422. License generator 418 generates the license which includes the terms of the license. Also included within the license, are the keys for decrypting the content file.

It should be observed that the content decryption keys are bound to the particular machine located on the client side 422. By way of example, particular information that is unique to the machine such as the machine identification number is bound to the license. In this way, the present invention implements a machine-binding solution which allows digital content playback only on a particular machine. Upon receiving the license from license generator 418, license server 416 forwards the license over the network to DRM proxy 404. In turn, DRM proxy forwards the license to module 406 for DRM-specific processing. DRM core 408 retrieves the license and stores the license within database 412.

Although not shown, the process for retrieving a license may occur subsequent to a purchase transaction such as when the user wishes to play back content offline. Further, license acquisition can also occur when there is no financial transaction involved; for example, when the user requests a trial license. A trial license permits a user to utilize the content files for a specific period after which the trial license expires. Table 1 below illustrates exemplary steps taken by system 400 to acquire a license when there is no financial transaction involved.

TABLE 1

1. A content player (not shown) asks DRM core 408 to play a content.
2. DRM core 408 checks its local store, e.g., license store 412, and finds there is no valid license available (it finds no license or license is expired).
3. DRM core 408 fields a license request message with the machine identification.
4. DRM core 408 invokes DRM proxy 404 to send a license request message.
5. DRM proxy starts a network job to send a license request message to license server 416.

TABLE 1-continued

6. License server 416 presents a page to collect license terms desired by the user and supported by system 400 before continuing with the processing of license request.
7. The terms of the license are collected and sent to data base 414.
8. The license request, along with the terms of the license and keys for decryption, are retrieved from data base 414 and are dispatched to license generator 418.
9. The license is generated from the obtained information.
10. The license data is returned to server 416.
11. License data is returned over the network to the DRM proxy 404.
12. DRM proxy 404 passes the license response message to DRM 406 for DRM-specific processing.
13. DRM module 406 via DRM core 408 saves the license data in its license store 412.

The present invention advantageously separates a portion of the content from the original content file until decryption time to prevent unauthorized content usage. Moreover, licenses are bound to particular machines so that copying the content to a machine other than the authorized machine is futile. The present invention also utilizes a secure data channel in which the content keys are passed in secured format. Code obfuscation is used to hide code that handles decrypted data.

Other advantages include the implementation of the DRM core and the DRM decoder within separate modules to increase the complexity for hackers, and the employment of session key-based on-line license verification to maximize security. In this manner, the system of the present invention manages rights to one or more digital content files within a computer network and limits the playback of such content files to an authorized user. Furthermore, the present invention facilitates distribution and content production, which ultimately results in a shorter product development cycle.

Description of Hardware

Figure 5A:
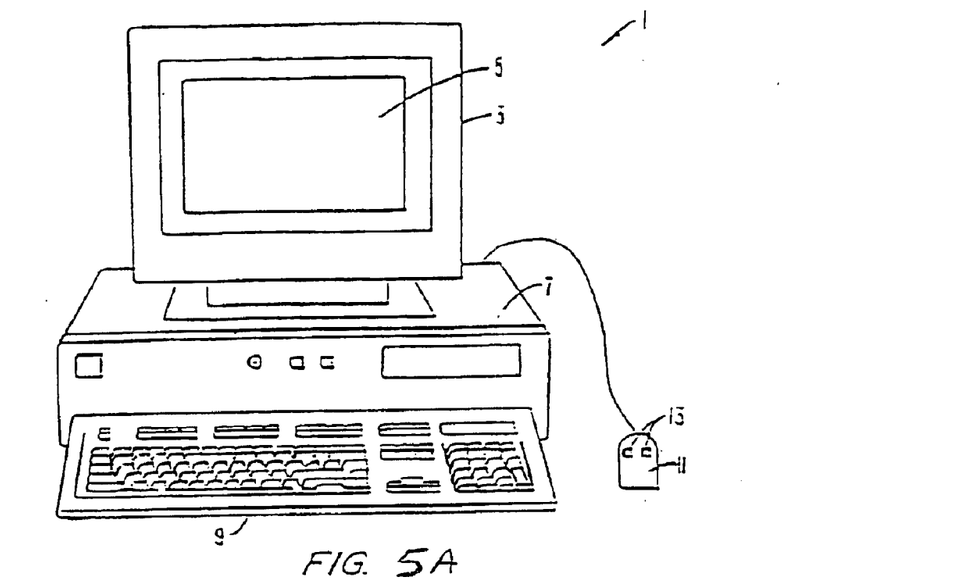
FIG. 5A is an illustration of a computer system including a display having a display screen.

FIG. 5A is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pen top, server, workstation, mainframe). Any hardware platform suitable for performing the processing described herein is suitable for use with the present invention.

Figure 5B:
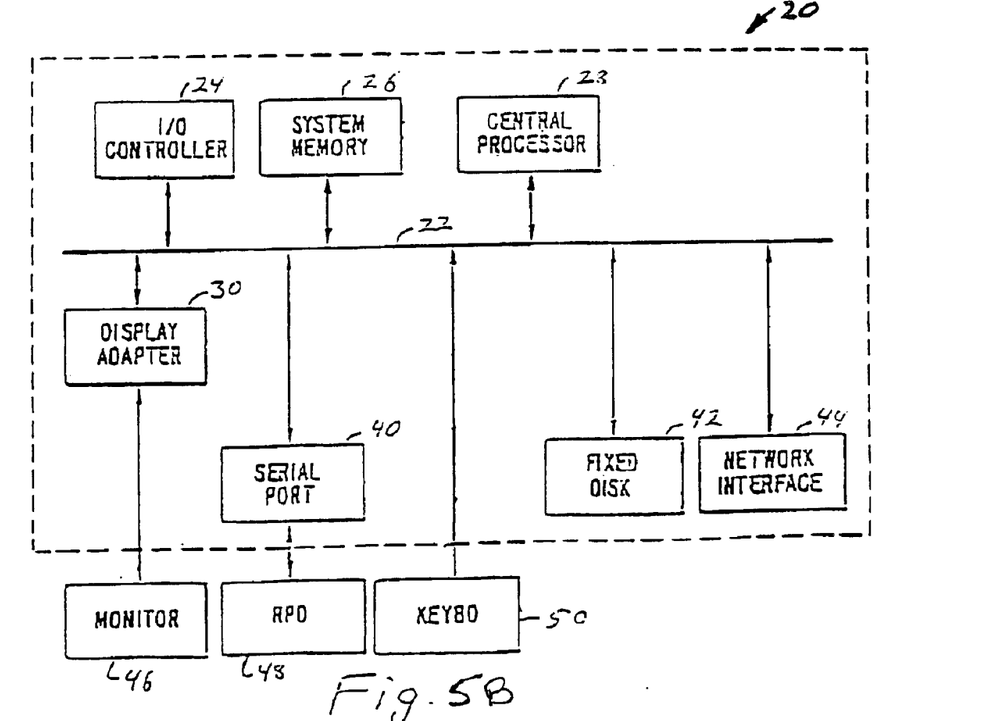
FIG. 5B illustrates subsystems that might typically be found in a computer such as computer 1.

FIG. 5B illustrates subsystems that might typically be found in a computer such as computer 1.

In FIG. 5B, subsystems within box 20 are directly interfaced to internal bus 22. Such subsystems typically are contained within the computer system such as within cabinet 7 of FIG. 5A. Subsystems include input/output (I/O) controller 24, System Random Access Memory (RAM) 26, Central Processing Unit (CPU) 28, Display Adapter 30, Serial Port 40, Fixed Disk 42 and Network Interface Adapter 44. The use of bus 22 allows each of the subsystems to transfer data among the subsystems and, most importantly, with the CPU. External devices can communicate with the CPU or other subsystems via bus 22 by interfacing with a subsystem on the bus. Monitor 46 connects to the bus through Display Adapter 30. A relative pointing device (RPD) 48 such as a mouse connects through Serial Port 40. Some devices such as Keyboard 50 can communicate with the CPU by direct means without using the main data bus as, for example, via an interrupt controller and associated registers (not shown).

As with the external physical configuration shown in FIG. 5A, many subsystem configurations are possible. FIG. 5B is illustrative of but one suitable configuration. Subsystems, components or devices other than those shown in FIG. 5B can be added. A suitable computer system can be achieved without using all of the subsystems shown in FIG. 5B. For example, a standalone computer need not be coupled to a network so Network Interface 44 would not be required. Other subsystems such as a CDROM drive, graphics accelerator, etc. can be included in the configuration without affecting the performance of the system of the present invention.

Figure 5C:
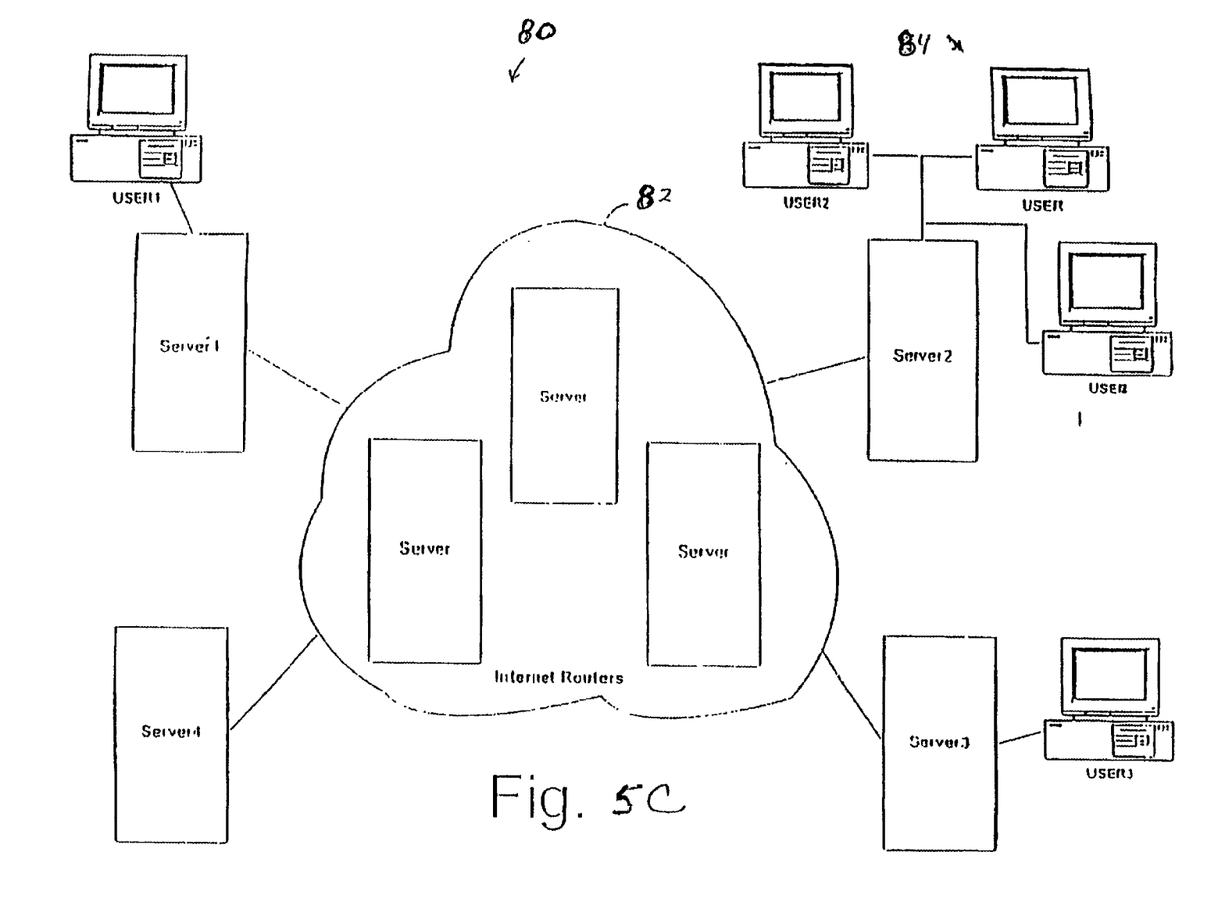
FIG. 5C is a generalized diagram of a typical communication network.

FIG. 5C is a generalized diagram of a typical network.

In FIG. 5C, the network system 80 includes several local networks coupled to the Internet. Although specific network protocols, physical layers, topologies, and other network properties are presented herein, the present invention is suitable for use with any network.

In FIG. 5C, computer USER1 is connected to Server1. This connection can be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 82. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 or T3 line. Similarly, other computers at 84 are shown utilizing a local network at a different location from USER1 computer. The computers at 84 are coupled to the Internet via Server2. USER3 and Server3 represent yet a third installation.

Note that the concepts of "client" and "server," as used in this application and the industry, are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention, may be presented as a single entity, such software is readily able to be executed on multiple machines. That is, there may be multiple instances of a given software program, a single program may be executing on two or more processors in a distributed processing environment, parts of a single program may be executing on different physical machines, etc. Further, two different programs, such as a client and server program, can be executing in a single machine, or in different machines. A single program can be operating as a client for one information transaction and as a server for a different information transaction.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method for permitting offline playback of a content file on a user computing device upon offline verification of the terms of a license for authorizing the playback of the content file, the method comprising:
   including within the license a segment which is a part of the content file;
   upon invoking payback of the content file:
   identifying the license by using one or more information fields within a header of said content file;
   verifying the terms of the license locally on the riser computing device while the user is offline;
   retrieving from the license, a session key for decrypting the content file;
   retrieving from the license, the segment which is part of the content file;
   decrypting the content file using the session key to enable playback of the content file for a single session; and
   combining the segment with the content file to enable playback of the content file.

2. The method of claim 1 further comprising receiving the content file and the license from one or more server computing systems.

3. The method of claim 2 further comprising separating the segment from the content file prior to the step of receiving the content file and the license.

4. The method of claim 2 further comprising combining the segment with the license prior to the step of receiving the content file and the license.

5. The method of claim 2 further comprising binding the license to the user computing device so that the content tile is playable only on the user computing device prior to the step of receiving the content file and the license.

6. The method of claim 1 further comprising replacing the segment with the header in the content file prior to the step of receiving the content file and the license.

7. A method for permitting offline license verification, and for enabling playback of a content file on a user computing device, the method comprising:
   receiving the content file from a computing system communicatively coupled to the user computing device, said content file including a header containing one or more information fields;
   receiving the license from a computing system communicatively coupled to the user computing device;
   identifying the license by using the one or more information fields within said header;
   verifying the terms of the license locally on the user computing device while the user is offline;
   retrieving from the license, a session key for decrypting the content file;
   retrieving from the license, a segment which is part of the content file;
   decrypting the content file using the session key to enable playback for a single session; and
   combining the segment with the content file to enable playback.

8. The method of claim 7 further comprising separating the first segment from the content file prior to the step of receiving the content file from a computing system.

9. The method of claim 7 further comprising combining the first segment with the license prior to the step of receiving the license from a computing system.

10. The method of claim 7 further comprising storing both the content file and the license within the user computing device to enable future playback of the content file.

11. A system for managing rights to a content file within a computer network, and to permit offline verification of a license for authorizing playback of the content file offline, the system comprising:
   a key for decrypting the content file;
   a first content portion which is part of the content file;
   a license for decrypting the content file, the license containing both the key and the first content portion;
   a first computer system for generating the content file, the first computer system further comprising,
      software containing one of more instructions for creating a header, said header comprising a first field having identification information,
      software containing one or more instructions for generating the key,
      software containing one or more instructions for encrypting the content file, and for removing the first content portion from the content file and substituting the header therefor;
   a second computer system for receiving the content file from the first computer system and for receiving the license, the second computer system further comprising,
      software containing one or more instructions for verifying the terms of the license locally on the second computer system while the user is offline;
      software containing one or more instructions for decrypting the content file using the key, upon receipt of the license, and
      software containing one or more instructions for combining the first content portion with the content file to enable playback of the content file.

12. A system for managing rights to a content file within a computer network, and to permit offline verification of said rights, the system comprising:
- a key for decrypting the content file;
- a first content portion which is part of the content file;
- a license for decrypting the content file, the license containing both the key and the first content portion;
- a first computer system for generating the content file, the first computer system further comprising,
  - software containing one or more instructions for encrypting the content file, and for removing the first content portion from the content file and substituting a header therefor;
- a second computer system for receiving the content file from the first computer system and for receiving the license, the second computer system further comprising,
  - software containing one or more instructions for identifying the license using the header;
  - software containing one or more instructions for verifying the terms of the license locally on the second computer system while the user is offline;
  - software containing one or more instructions for decrypting the content file using the key, to enable playback of the content file while the user is offline; and
  - software containing one or more instructions for combining the first content portion with the content file to enable playback of the content file.

13. The system of claim 12 wherein the header contains one or more information fields for identifying the license.

14. The system of claim 12 wherein the first computer system has software containing one or more instructions for creating the header.

15. The system of claim 12 wherein first computer system has software containing one or more instructions for generating the key.

* * * * *